US008153332B2

(12) United States Patent
Aoyama et al.

(10) Patent No.: US 8,153,332 B2
(45) Date of Patent: Apr. 10, 2012

(54) FUEL CELL SYSTEM

(75) Inventors: Satoshi Aoyama, Susono (JP); Satoshi Iguchi, Mishima (JP); Koichi Numata, Mishima (JP); Masahiko Iijima, Ohi-machi (JP); Naoki Ito, Yokohama (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1451 days.

(21) Appl. No.: 10/553,213

(22) PCT Filed: Mar. 10, 2004

(86) PCT No.: PCT/JP2004/003144
§ 371 (c)(1),
(2), (4) Date: Dec. 16, 2005

(87) PCT Pub. No.: WO2004/082049
PCT Pub. Date: Sep. 23, 2004

(65) Prior Publication Data
US 2006/0286417 A1    Dec. 21, 2006

(30) Foreign Application Priority Data

Mar. 11, 2003 (JP) .................................. 2003-64478

(51) Int. Cl.
*H01M 8/10* (2006.01)
*H01M 4/02* (2006.01)
(52) U.S. Cl. .................... 429/529; 429/481; 429/491
(58) Field of Classification Search .................... 429/17, 429/19, 23, 24, 481, 491, 529
See application file for complete search history.

(56) References Cited

U.S. PATENT DOCUMENTS

| 4,684,581 | A | 8/1987 | Struthers |
| 4,702,973 | A | 10/1987 | Marianowski |
| 2002/0031695 | A1 | 3/2002 | Smotkin |
| 2003/0061937 | A1* | 4/2003 | Ito et al. .............................. 96/4 |
| 2004/0038091 | A1* | 2/2004 | Isom et al. ...................... 429/13 |

FOREIGN PATENT DOCUMENTS

JP   A 5-299105   11/1993

(Continued)

OTHER PUBLICATIONS

Takehara, "Nenryo Denchi Gijutsu to sono Oyo," Shohan, Technosystem, pp. 239-243, Jan. 30, 2000.

*Primary Examiner* — Patrick Joseph Ryan
*Assistant Examiner* — Muhammad Siddiquee
(74) *Attorney, Agent, or Firm* — Oliff & Berridge, PLC (57) ABSTRACT

Fuel cells 100 of the invention are operable at a temperature of about 500° C. The unit cell has a solid oxide electrolyte layer formed on a hydrogen separable metal layer. An anode has a catalyst supported thereon to accelerate a reforming reaction of methane. A fuel gas is produced by reforming a hydrocarbon-containing material in a reformer 20. Setting a lower reaction temperature enables production of the fuel gas containing both methane and hydrogen. In the fuel cells 100 receiving a supply of the fuel gas, the reforming reaction of methane contained in the fuel gas proceeds simultaneously with consumption of hydrogen contained in the fuel gas. This methane reforming reaction is endothermic to absorb heat produced in the process of power generation and thereby equalizes the operation temperature of the fuel cells 100.

9 Claims, 6 Drawing Sheets

FOREIGN PATENT DOCUMENTS

| | | |
|---|---|---|
| JP | A 2000-53403 | 2/2000 |
| JP | A 2002-56873 | 2/2002 |
| JP | A 2002-249303 | 9/2002 |
| JP | A 2002-289245 | 10/2002 |
| JP | A 2003-59519 | 2/2003 |
| JP | A 2003-112020 | 4/2003 |
| JP | A 2004-71450 | 3/2004 |
| JP | A 2004-146337 | 5/2004 |

* cited by examiner

FUEL CELL SYSTEM

TECHNICAL FIELD

The present invention relates to a fuel cell system and its control method.

BACKGROUND ART

Fuel cells generating electric power by an electrochemical reaction of hydrogen with the air have recently drawn attention as the novel energy source. Fuel cells having solid electrolyte membranes include low-temperature-operation-type fuel cells, such as polymer electrolyte fuel cells, and high-temperature-operation-type fuel cells, such as solid oxide fuel cells.

The polymer electrolyte fuel cell has a solid polymer film, for example, a Nafion (registered trademark) film applied to an electrolyte membrane interposed between electrodes. A decrease in water content of this electrolyte membrane lowers the ion conductivity and increases the film resistance. Control of the film resistance in a practical range requires operation of these fuel cells in a relatively low temperature range that prevents extreme evaporation of the water content. The polymer electrolyte fuel cells are generally operated in a low temperature range of not higher than 150° C.

The solid oxide fuel cell has a zirconia thin film or another inorganic thin film applied to the electrolyte membrane interposed between the electrodes. The film resistance of this electrolyte membrane increases with a temperature decrease. Control of the film resistance in a practical range requires operation of these fuel cells in a relatively high temperature range. Reduction of the thickness of the electrolyte membrane naturally decreases the film resistance, but it is extremely difficult to form a dense thin film on the electrode of a porous material. Sufficient reduction of the membrane thickness is thus not attainable. The solid oxide fuel cells are generally operated in a high temperature range of not lower than approximately 700° C.

The fuel cells of these two different operation types are both cooled down by circulation of cooling water to be operated in the respective adequate temperature ranges as disclosed in Japanese Patent Laid-Open Gazette No. 2002-249303.

The cooling water circulated through the fuel cells is gradually heated up to have a higher temperature and a lower cooling efficiency in the downstream. The variation of the cooling efficiency inside the fuel cells causes a temperature gradient in the fuel cells and may lower the power generation efficiency. This problem is not characteristic of the fuel cells having the solid electrolyte membranes but is commonly found in various types of fuel cells.

DISCLOSURE OF THE INVENTION

The object of the invention is thus to solve the problem of the prior art technique and to prevent a temperature gradient in fuel cells and thereby improve the power generation efficiency.

The invention is directed to a fuel cell system including fuel cells, a fuel gas supply module that supplies a fuel gas to anodes of the fuel cells, and an oxidizing gas supply module that supplies an oxidizing gas to cathodes of the fuel cells. The fuel gas contains hydrogen as well as a hydrocarbon compound. The fuel cells have a catalyst supported on their anode side to accelerate an endothermic reaction of the hydrocarbon compound. The endothermic reaction consumes heat produced in the power generation process in the fuel cells and accordingly cools down the fuel cells without circulation of a coolant. This effectively prevents a potential temperature gradient, which is often observed in the conventional cooling system with a coolant, and thus enhances the power generation efficiency. The technique of the invention may be combined with the conventional cooling system with a coolant. Such combination advantageously reduces the required size of the cooling system. The endothermic reaction in the fuel cells is preferably a reaction of producing hydrogen from a hydrocarbon compound. One typical example of such reactions is steam reforming reaction. The shift reaction of producing hydrogen from carbon monoxide and steam may also be initiated in the fuel cells.

Hydrogen and the hydrocarbon compound contained in the fuel gas may be supplied from the respective storages or may be produced by reforming a selected material in a reformer unit. The material may be any of hydrocarbons, alcohols, and aldehydes. After production of only hydrogen in the reformer unit, the hydrocarbon compound may be added to be used for the endothermic reaction in the fuel cells. The operation of the reformer unit may be controlled to produce hydrogen and the hydrocarbon compound from the selected material. For example, methane, one of typical hydrocarbons, is produced by controlling the reaction temperature in the reformer unit to a lower level.

The hydrocarbon compound of the invention may be any of various compounds usable for endothermic reactions, for example, methanol and methane. When methane is selected as the hydrocarbon compound, the catalyst supported on the anode side of the fuel cells is preferably a methane reforming catalyst including at least one of Ni, Rh, Ru, and their alloys.

In the fuel cell system of the invention, supplies of oxygen and steam may be introduced into the reformer unit to cause a partial oxidation reaction in parallel with steam reforming reaction. The partial oxidation reaction is an exothermic reaction to produce hydrogen from the selected material with oxygen. The steam reforming reaction is an endothermic reaction to produce hydrogen from the selected material with steam. This arrangement enables heat produced by the partial oxidation reaction to be consumed by the steam reforming reaction. A less supply of oxygen than the required amount for the heat balance between these parallel reactions suppresses the heat generation and lowers the reaction temperature in the reformer unit to produce both the hydrocarbon compound and hydrogen. This also suppresses the rate of the partial oxidation reaction having a relatively low efficiency of hydrogen production and thereby increases the total efficiency of hydrogen production from the selected material.

For the stable operation of the fuel cell system of the invention, the preferable procedure controls the amount of heat produced by the reaction in the fuel cells to attain a preset target temperature. The amount of heat production may be controlled by regulating the flows of hydrogen and the oxidizing gas used for power generation, by regulating the supply of the hydrocarbon compound used for the endothermic reaction, or by regulating the power generation. The flow of hydrogen and the supply of the hydrocarbon compound may be varied by controlling the reaction temperature in the reformer unit or by regulating the supply of the selected material to the reformer unit.

In the fuel cell system of the invention, the reaction proceeding in the fuel cells may be an irreversible endothermic reaction or a heat-involved reversible reaction that is endothermic in the reaction path of consuming the hydrocarbon compound. The heat-involved reversible reaction has various advantages. The first advantage is an even temperature distribution in the fuel cells. The heat-involved reversible reaction shifts the equilibrium according to the local temperature variation in the fuel cells and the consumption of hydrogen. Consumption of the hydrocarbon compound is reduced in the low temperature sites, while being encouraged in the high temperature sites in the fuel cells. This desirably equalizes the temperature in the fuel cells.

The second advantage is the enhanced stability of the fuel cells in a transitional period. The heat-involved reversible reaction consumes heat and produces hydrogen to relatively easily and quickly achieve the heat balance with the heat evolution in power generation and the hydrogen balance with the consumption of hydrogen in power generation. This arrangement desirably prevents extreme changes of the operation temperature and the hydrogen consumption even in the transitional period with a variation in power generation demand to the fuel cells and thus enables the stable operation of the fuel cells.

The preferable procedure controls the operation temperature of the fuel cells simultaneously with the operation temperature of the reformer unit to reduce a temperature difference between the reformer unit and the fuel cells within a preset range. Such temperature control desirably reduces the required size of a heat exchanger provided between the reformer unit and the fuel cells or even allows omission of the heat exchanger. Reduction of the temperature difference to substantially zero is desirable. Such temperature control is especially effective for the heat-involved reversible reaction caused in the fuel cells. The heat-involved reversible reaction shifts the equilibrium according to the temperature of the fuel cells. When there is a significant temperature difference between the reformer unit and the fuel cells, the composition of the fuel gas discharged from the reformer unit is changed at the moment of supply to the fuel cells and may damage the expected cooling effect. Reduction of the temperature difference between the reformer unit and the fuel cells within the preset range or preferably to substantially zero desirably eliminates this potential disadvantage.

In the fuel cell system of the invention, the operation temperature of the fuel cells is controlled preferably in a range of approximately 200 to 600° C. or more preferably at a level of 500° C., in order to accelerate the reversible reaction in the fuel cells. The fuel cells are thus constructed to be operable in this intermediate temperature range. The operation of the fuel cells in the intermediate temperature range is allowed by specifying the structure of an electrolyte membrane interposed between the anode and the cathode as described below.

In a first preferable structure, the electrolyte membrane includes a dense base of a hydrogen permeable material and an inorganic electrolyte layer formed on at least one face of the dense base. Formation of the electrolyte layer on the dense base enables sufficient reduction of the thickness of the electrolyte layer. For example, the thickness of the electrolyte layer is reduced from the conventional level of greater than 10 µm to the level of 0.1 to 1 µm. The electrolyte membrane of this first structure thus desirably lowers the operation temperature of the high-temperature-operation-type fuel cells. The inorganic electrolyte layer may be made of a ceramic proton conductor, for example, $BaCeO_3$ or $SrCeO_3$. The electrolyte layer may be formed on a single face or on both faces of the base. In the latter case, the base is placed between a pair of electrolyte layers.

The electrolyte membrane of the first structure may additionally have a coat of a hydrogen permeable material covering over one face of the electrolyte layer that is not in contact with the base. Typical examples of the hydrogen permeable material include vanadium, niobium, tantalum, alloys including at least one of these metals, palladium, and palladium alloys. Formation of the coat desirably protects the electrolyte layer. The base is preferably made of any of vanadium, niobium, tantalum, and alloys including at least one of these metals. These metals and alloys are relatively inexpensive and have high hydrogen permeabilities. Application of these materials thus enables formation of a base having a sufficient thickness with a low cost.

In a second preferable structure, the electrolyte membrane includes a water-containing electrolyte layer having a water content and dense film layers of a hydrogen permeable material formed on both faces of the electrolyte layer. In the electrolyte membrane of this second structure, the coats of the dense film layers covering over both faces of the water-containing electrolyte layer effectively prevent evaporation of the water content from the water-containing electrolyte layer even in the high-temperature operation of the fuel cells. The electrolyte membrane of this second structure thus desirably heightens the operation temperature of the low-temperature-operation-type fuel cells. The water-containing electrolyte layer may be a solid polymer film, for example, a Nafion (registered trademark) film, or a water-containing ceramic, glass, or alumina film, such as a heteropoly acid film or a water-containing β-alumina film.

In the electrolyte membrane of the second structure, the dense film layer may be made of, for example, one of vanadium, niobium, tantalum, and alloys including at least one of these metals. Preferable examples are metal vanadium or vanadium-nickel alloy. These metals and alloys are relatively inexpensive and have high hydrogen permeabilities. Application of these materials is allowable to the dense film layer on the anode side but is preferable to only the dense film layer on the cathode side. The dense film layer of any of these materials on the anode side has the potential for hydrogen brittleness. The dense film layer on the anode side is thus preferably made of, for example, palladium or a palladium alloy.

The catalyst may be supported on the anode side of the fuel cells in any of various ways, for example, on the anode or on a face of the electrolyte layer that is in contact with the anode. The technique of the present invention is not restricted to the fuel cell system but is actualized by diversity of other applications, for example, fuel cells having a catalyst supported thereon to accelerate an endothermic reaction of a hydrocarbon compound and a control method of the fuel cell system.

BEST MODES FOR CARRYING OUT THE INVENTION

A. First Embodiment

A1. System Configuration

Figure 1:
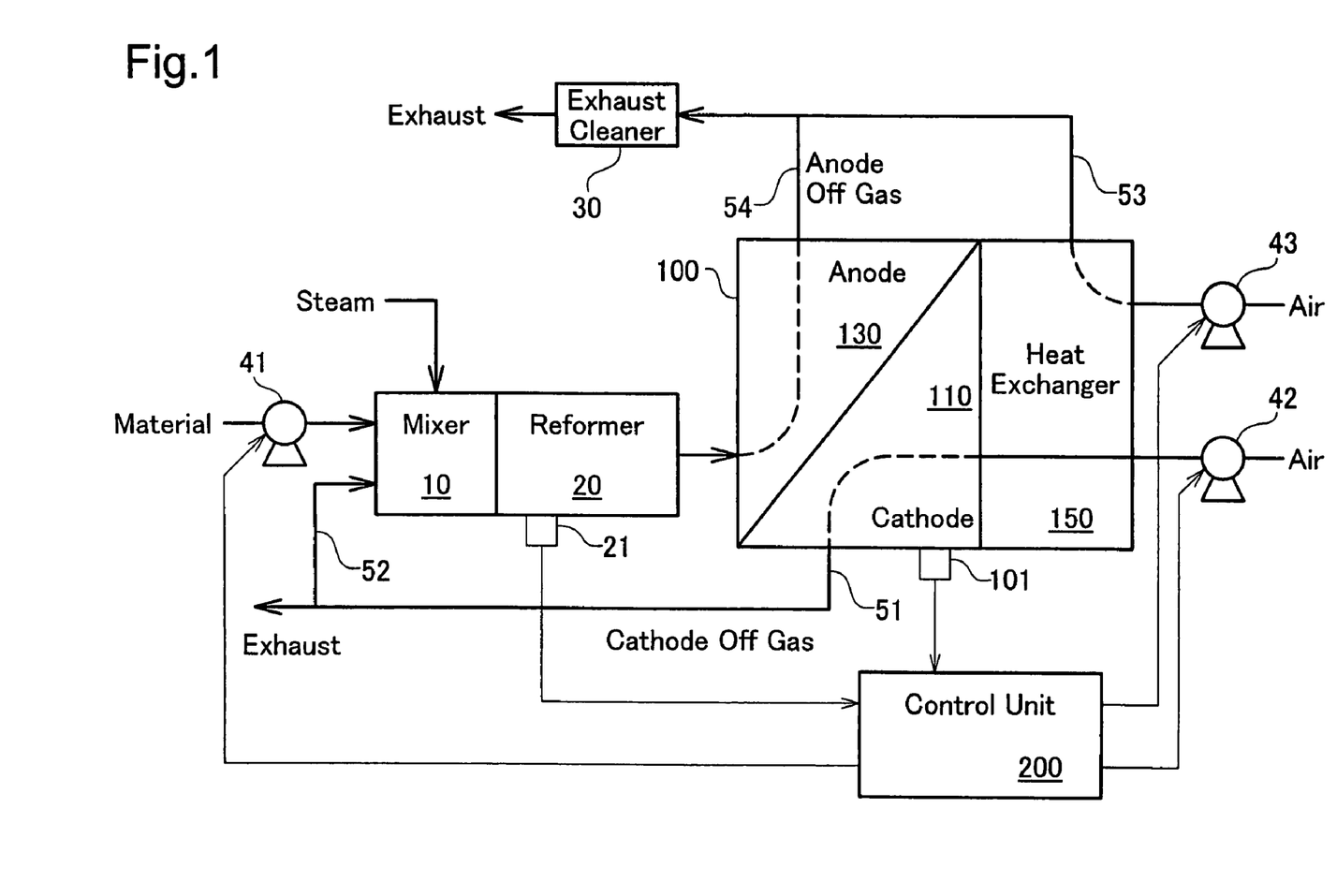
FIG. 1 schematically illustrates the configuration of a fuel cell system in a first embodiment.

FIG. 1 schematically illustrates the configuration of a fuel cell system in a first embodiment. The fuel cell system of the first embodiment includes fuel cells 100 that generate electric power by an electrochemical reaction of hydrogen included in a supply of a fuel gas to anodes 130 with oxygen included in a supply of the air to cathodes 110. The fuel cells 100 have solid electrolyte membranes and are operated at a temperature of about 500° C. as described later in detail.

The intake air by a pump 42 flows through a heat exchanger 150 to cool the fuel cells 100 down and is then supplied to the cathodes 110. An exhaust gas from the cathodes 110 after the reaction (hereafter referred to as cathode off gas) is discharged through an exhaust conduit 51. Part of the cathode off gas is introduced via a branched pipe 52 into a mixer 10 to be used for a reforming reaction for generation of hydrogen, as described later.

The fuel gas supplied to the anodes 130 is produced by a reforming reaction of a selected material containing hydrogen, for example, a hydrocarbon like gasoline, an alcohol like methanol, or an aldehyde.

The hydrogen-containing material is introduced by a pump 41 into the mixer 10 to be blended with the air remaining in the cathode off gas and with a separate supply of steam. The resulting gas mixture is led into a reformer 20 to be subject to the reforming reaction. In the fuel cell system of this embodiment, the reforming reaction generates the fuel gas containing methane as well as hydrogen, carbon dioxide, and carbon monoxide, as described later. The reformer 20 has a catalyst supported thereon to accelerate this reforming reaction, for example, a base metal catalyst like copper or zinc or a noble metal catalyst like platinum.

The fuel gas supplied to the anodes 130 is consumed for power generation and is discharged through an exhaust conduit 54 as anode off gas. Prior to the discharge, the anode off gas passes through an exhaust cleaner 30 for removal of remaining hydrogen unconsumed in the process of power generation and other toxic components. In the system of this embodiment, the toxic components are burnt off in the exhaust cleaner 30. The air used for such combustion is fed through an air conduit 53 by a pump 43. The air for combustion is flowed through the heat exchanger 150 and is thus also usable to cool the fuel cells 100 down.

The operations of this fuel cell system are under control of a control unit 200, which is constructed as a microcomputer including a CPU, a RAM, and a ROM. The CPU controls the operations of the respective constituents in the fuel cell system according to a program stored in the ROM. The operation control includes control of the operation temperatures of the respective constituents and control of power generation by the fuel cells. Diverse signals required for such control are input into and output from the control unit 200. As an example, the illustration of FIG. 1 includes input signals from a temperature sensor 101 that measures the temperature of the fuel cells 100 and from a temperature sensor 21 that measures the temperature of the reformer 20, as well as output signals to the pumps 41 to 43. These signals are used for the temperature control.

A2. Reforming Reaction

In the reformer 20 of this embodiment, a partial oxidation reaction of producing hydrogen from the material and oxygen proceeds in parallel with steam reforming reaction of producing hydrogen from the material and steam. The partial oxidation reaction and the hydrogen reforming reaction are respectively given as Equations (1) and (2), where the material used is a hydrocarbon $C_nH_m$ and Q1 and Q2 represent amounts of heat involved in the respective reactions:

$$C_nH_m + nO_2 \rightarrow (m/2)H_2 + nCO_2 + Q1 \tag{1}$$

$$C_nH_m + 2nH_2O \rightarrow (m/2+2n)H_2 + nCO_2 - Q2 \tag{2}$$

The partial oxidation reaction is exothermic and the steam reforming reaction is endothermic. Equations (1) and (2) show the reactions proceeding in the ideal state. In the actual reaction conditions, however, carbon monoxide (CO) may also be produced. The reforming reaction may additionally produce methane ($CH_4$) in a certain range of reaction temperature.

Figure 2:
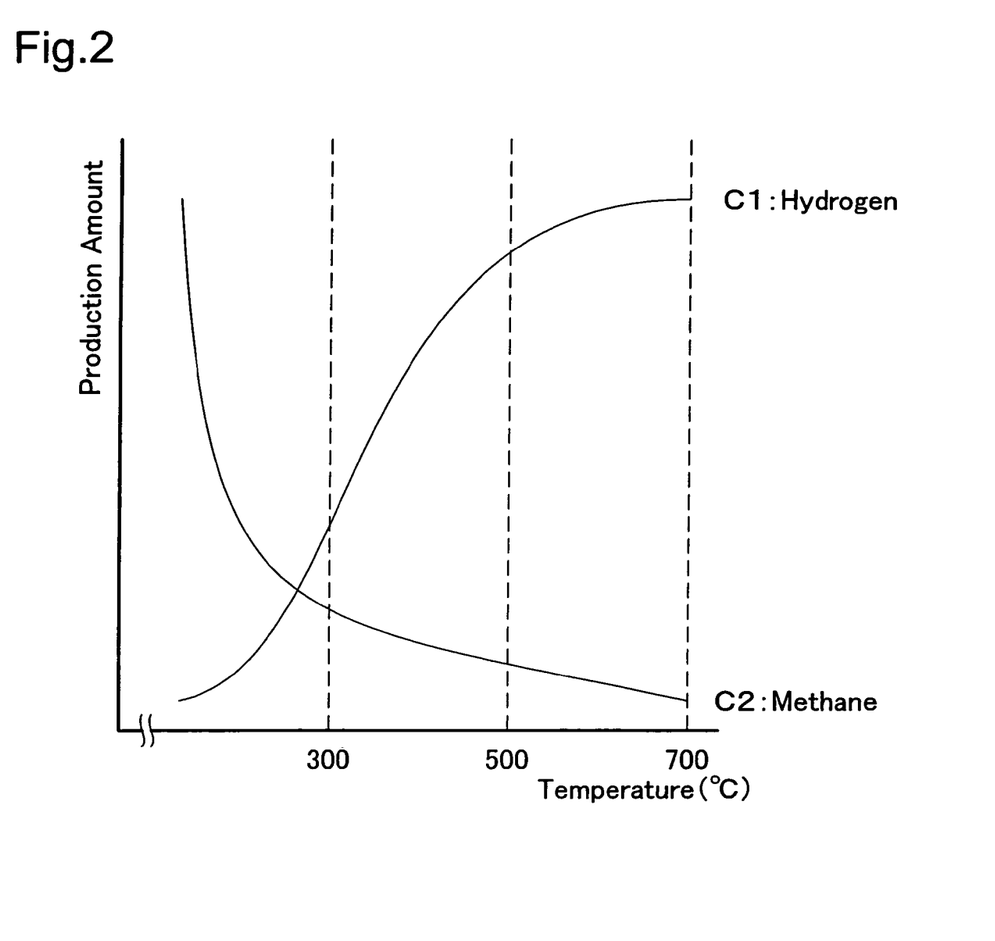
FIG. 2 is a graph showing variations in amounts of products by a reforming reaction against the reaction temperature.

FIG. 2 is a graph showing variations in amounts of products by the reforming reaction against the reaction temperature. A hydrocarbon is used as the material of the reforming reaction in this illustrated example. An increase in reaction temperature leads to an increase in production amount of hydrogen (Curve C1) and a decrease in production amount of methane (Curve C2). The reforming reaction at the high temperature level of 700° C. is preferable for the high production efficiency of hydrogen. In the system of this embodiment, however, the temperature of the reformer 20 is kept at a relatively low level to produce a good amount of methane by the reforming reaction. The reaction temperature for this purpose is selectable in a range of 200 to 600° C., and 500° C. is adopted for the reaction temperature of this embodiment.

The reaction temperature is controlled to this temperature level, based on the following theory. As clearly shown by Equations (1) and (2) given above, the partial oxidation reaction is exothermic and the steam reforming reaction is endothermic. The increased supply of oxygen increases the heating value and heightens the operation temperature of the reformer 20. The reduced supply of oxygen, on the other hand, decreases the heating value and lowers the operation temperature of the reformer 20. For example, setting a ratio O/C of oxygen to carbon in the material to approximately 0.8 attains the reaction temperature of about 700° C. The system of this embodiment regulates the oxygen-carbon ratio O/C to a lower level in a range of approximately 0.2 to 0.3 to attain the lower reaction temperature of about 500° C.

The above description regards the hydrocarbons used as the material. The similar phenomena are observed in the reforming reactions of alcohols or aldehydes. The reaction temperature and the oxygen-carbon ratio O/C are controlled to adequate setting values, based on the production amounts of hydrogen and methane from the selected material.

A3. Solid Oxide Fuel Cells

Figure 3:
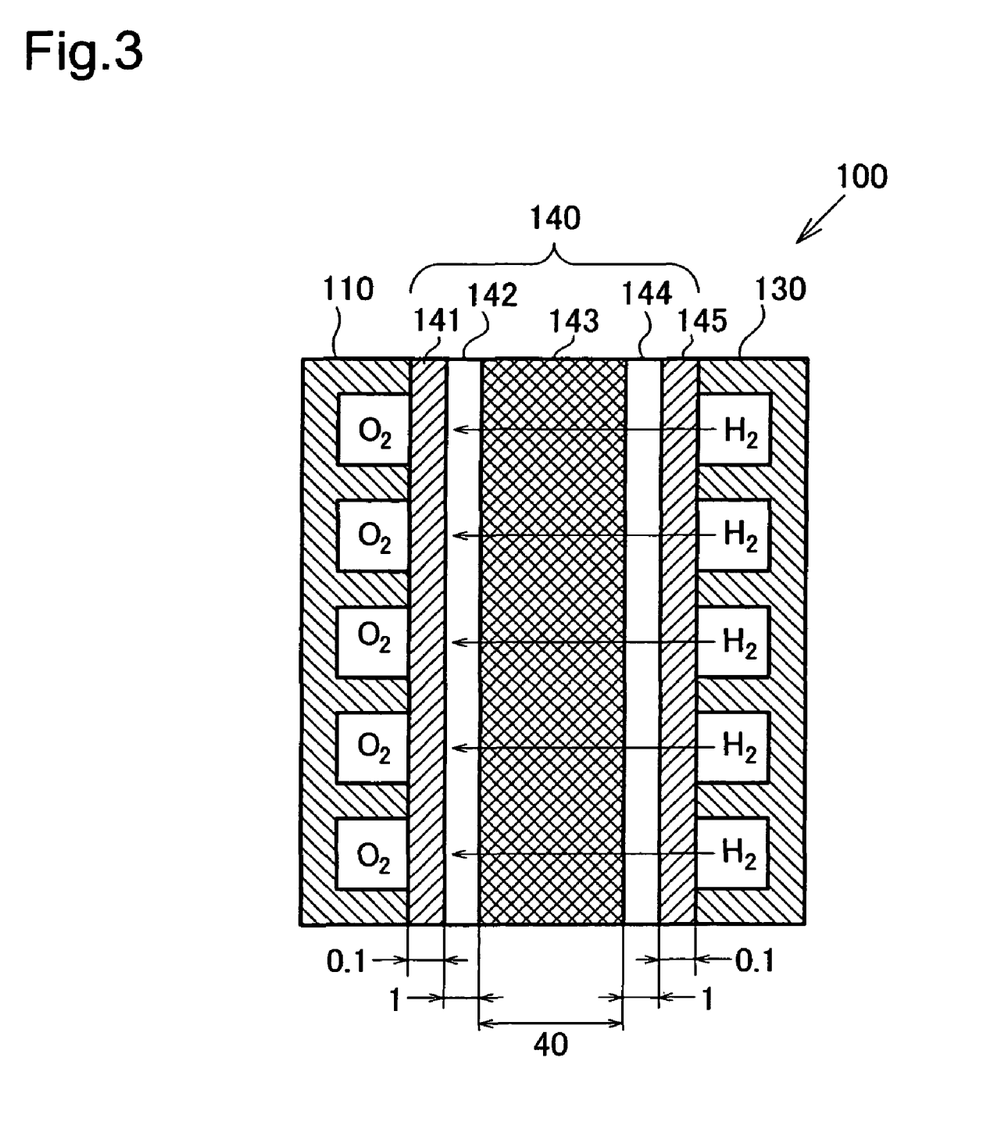
FIG. 3 shows one unit cell structure of fuel cells 100.

FIG. 3 is a sectional view showing one unit cell structure of the fuel cells 100. The unit cell includes the cathode 110 and the anode 130 arranged across an electrolyte membrane 140. The cathode 110 has a flow path for the supply of the air, and the anode 130 has a flow path for the supply of the fuel gas. The cathode 110 and the anode 130 may be made of any of diverse materials, for example, carbon.

The electrolyte membrane 140 has a five-layered structure including a dense vanadium (V) base 143 as its center. Thin films of electrolyte layers 142 and 144 are formed on both faces of the base 143. The electrolyte layers 142 and 144 are made of a ceramic proton conductor, for example, $BaCeO_3$ or $SrCeO_3$. Palladium (Pd) coats 141 and 145 are placed on the respective outer faces of the electrolyte layers 142 and 144. In the unit cell structure of this embodiment, the Pd coats 141 and 145 have a thickness of 0.1 μm, the electrolyte layers 142 and 144 have a thickness of 1 μm, and the base 143 has a thickness of 40 μm. These values are not restrictive and the thicknesses of the respective layers may be set arbitrarily. In the fuel cells 100, formation of the electrolyte layers 142 and 144 on the dense base 143 enables sufficient reduction of the thickness of the electrolyte layers 142 and 144. This lowers the film resistance of the solid oxides and enables the operations of the fuel cells in a significantly lower temperature range of 200 to 600° C. than the general operation temperature of the conventional fuel cells.

The unit cell generally has catalyst layers, typically platinum (Pt) layers, to accelerate the reactions on the hydrogen electrode and the oxygen electrode in the process of power generation. The catalyst layers are formed, for example, between he electrolyte membrane 140 and the cathode 110 and between the electrolyte membrane 140 and the anode 130, although being omitted from the illustration. The catalyst layers may otherwise be formed between the respective coats 141 and 145 and the adjoining electrolyte layers 142 and 144 or between the base 143 and the electrolyte layers 142 and 144.

As mentioned previously, in the system of this embodiment, the fuel gas supplied to the anodes contains methane. Hydrogen is produced from methane by a reforming reaction expressed as Equation (3) given below:

$$CH_4 + H_2O \leftarrow\rightarrow 3H_2 + CO - Q1 \quad (3)$$

where the symbol '←→' represents a reversible reaction, and Q1 denotes the amount of heat involved in the reaction. The reaction of Equation (3) is endothermic when going right to produce hydrogen.

In the fuel cells 100, a catalyst is supported on the anode side to accelerate the reaction of Equation (3). One or a combination of Ni, Rh, Ru, and their alloys is usable for the catalyst. The catalyst may be supported on any of various sites exposed to the fuel gas, for example, on the coat 145 or on the anode 130.

The unit cell structure of the fuel cells 100 shown in FIG. 3 has the five-layered electrolyte membrane 140. One or both of the coats 141 and 145 and one of the electrolyte layers 142 and 144 may be omitted from the five-layered structure when not required.

A4. Polymer Electrolyte Fuel Cells

Figure 4:
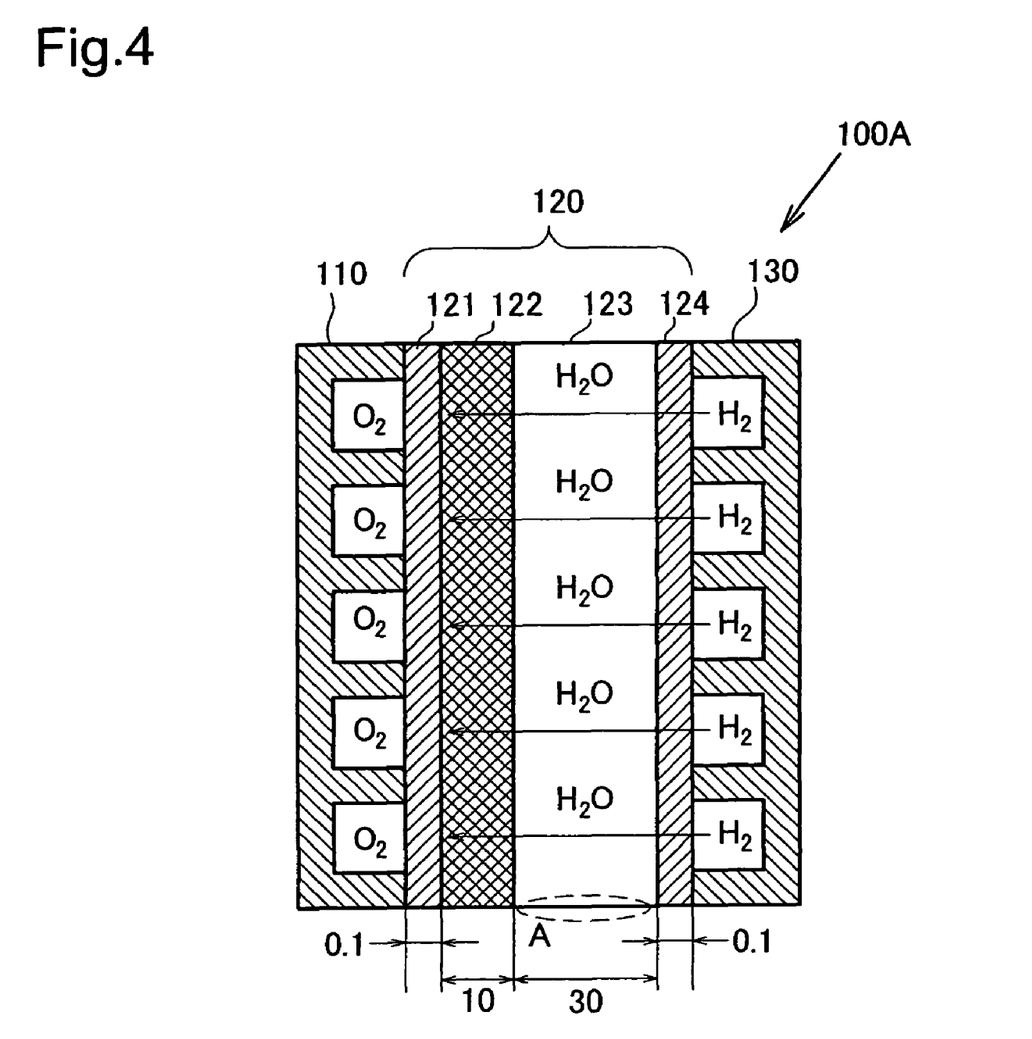
FIG. 4 shows another unit cell structure of fuel cells 100A in one modified example.

FIG. 4 shows another unit cell structure of fuel cells 100A in one modified example. The unit cell structure of this modified example includes an electrolyte membrane 120 having a solid polymer film. The electrolyte membrane 120 has a multi-layered structure of hydrogen permeable dense metal layers formed on both faces of an electrolyte layer 123 as the solid polymer film. The electrolyte layer 123 is, for example, a Nafion (registered trademark) film. A palladium (Pd) dense layer 124 is formed on an anode side of the electrolyte layer 123, while a vanadium-nickel alloy (V—Ni) dense layer 122 is formed on a cathode side of the electrolyte layer 123. A Pd dense layer 121 is further laid on a cathode side of the dense layer 122. In the unit cell structure of this modified example, the Pd dense layers 121 and 124 have a thickness of 0.1 μm, the V—Ni dense layer 122 has a thickness of 10 μm, and the electrolyte layer 123 has a thickness of 30 μm. These values are not restrictive and the thicknesses of the respective layers may be set arbitrarily.

The electrolyte layer 123 has water content. The electrolyte layer 123 is placed between the pair of dense layers 122 and 124 as mentioned above. It is thus highly improbable that the water content in the electrolyte layer 123 is transmitted through these dense layers 122 and 123 to reach the electrodes or even to be released from the unit cell. Sealing the periphery of the electrolyte layer 123 (for example, an illustrated area A) prevents release of the water content from the periphery. The combination of the dense layers 122 and 124 with the peripheral sealing functions as a water retention structure to keep the water content in the electrolyte layer 123. The water retainable structure to keep the water content in the solid polymer film enables the fuel cells 100A to be operated in a significantly lower temperature range of 200 to 600° C. than the general operation temperature of the conventional fuel cells.

Like the unit cell structure of the fuel cells 100 shown in FIG. 3, the unit cell structure of the fuel cells 100A of this modified example has a catalysts support, for example, platinum, to accelerate the reaction in the process of power generation and a catalyst to accelerate the reforming reaction of methane.

A5. Reaction Process in Power Generation

Figure 5:
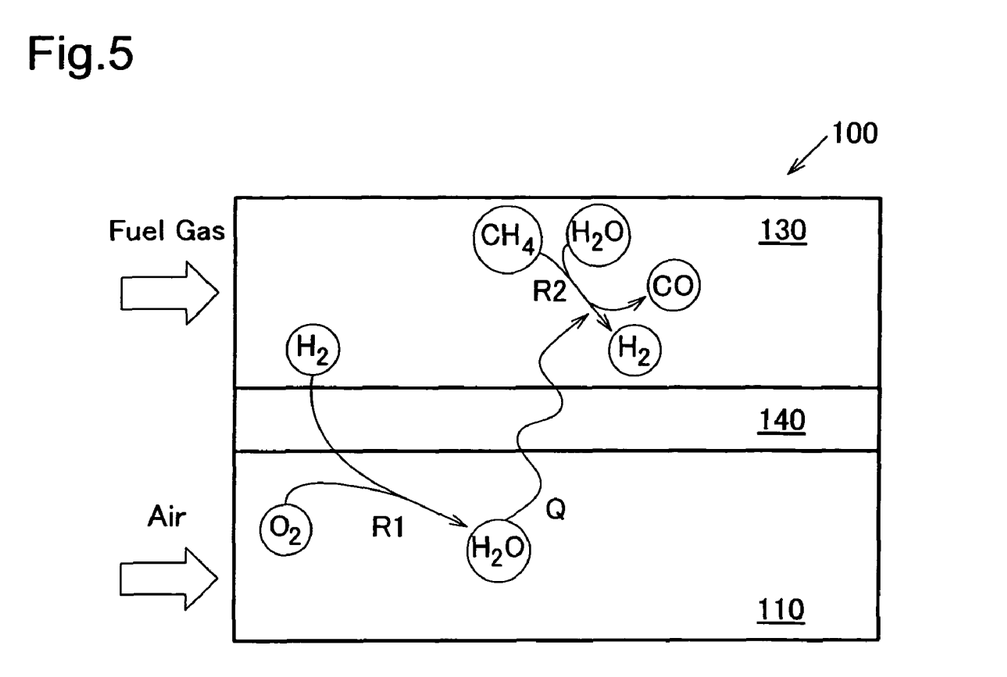
FIG. 5 shows a reaction process in power generation of the fuel cells 100.

FIG. 5 shows a reaction process in power generation of the fuel cells 100. The anodes 130 receive a supply of the fuel gas containing both hydrogen and methane. The hydrogen moving through the electrolyte membrane 140 is protonated and reacts with oxygen included in the supply of the air to the cathodes 110 to generate electric power and simultaneously produce water (reaction R1). The reaction R1 is exothermic and produces an amount of heat Q.

The catalyst for accelerating the reforming reaction of methane is supported on the anodes 130. The catalytic function accelerates the reforming reaction of methane with the amount of heat Q generated in the process of power generation to produce hydrogen (reaction R2). Steam used for the reforming reaction may be unconsumed steam in the reformer 20 or may be supplied independently. The reforming reaction of methane is endothermic to consume the amount of heat Q generated in the process of power generation and accordingly restrains a temperature rise in the fuel cells 100. From this point of view, the reforming reaction of methane has the function of cooling down the fuel cells 100.

The reforming reaction of methane is reversible and does not go right to produce hydrogen under the condition of no heat generation due to consumption of the hydrogen supplied to the anodes 130. It is thus highly improbable that the reforming reaction continuously goes right to be excessively endothermic and drop the operation temperature of the fuel cells 100 to an excessively low level. Consumption of a large mass of hydrogen with generation of a large amount of heat leads to reforming of a large mass of methane with absorption of a large amount of heat. It is thus highly improbable that the reforming reaction continuously goes left to be excessively exothermic and raise the operation temperature of the fuel cells 100 to an excessively high level. The reforming reaction of methane proceeds in parallel with the reaction for power generation in the fuel cells 100 and accordingly stabilizes the operation temperature of the fuel cells 100. The combination of these parallel reactions desirably equalizes the temperatures at the respective sites of the fuel cells 100, while effectively preventing an abrupt change of the operation temperature in a transitional period with a variation in power generation demand.

A6. Temperature Control

The system of this embodiment controls the operation temperatures of the fuel cells 100 and the reformer 20 to be substantially kept at an identical target level of 500° C., in order to attain the operation conditions described above. The reforming reaction of methane is a reversible reaction and shifts the equilibrium with a variation in temperature of the fuel gas to change the composition of the produced fuel gas. The lower temperature of the fuel gas makes the methane reforming reaction go right to consume hydrogen and increase the content of methane. The higher temperature of the fuel gas, on the other hand, makes the methane reforming reaction go left to produce hydrogen and decrease the content of methane. The reforming reaction causing the composition change of the fuel gas locally proceeds in the vicinity of a supply inlet of the fuel gas to the fuel cells 100. This may interfere with the temperature equalization in the fuel cells 100. The temperature control prevents such interference.

The control unit 200 receives the measured temperatures of the fuel cells 100 and the reformer 20 from the temperature sensors 101 and 21 and controls the operation temperatures of the fuel cells 100 and the reformer 20 to the identical target level of 500° C. In the system of this embodiment, the identical target level is set to the operation temperatures of both the reformer 20 and the fuel cells 100. Different target temperatures may be selected for the operation temperatures of the reformer 20 and the fuel cells 100. Setting sufficiently close target temperatures to the operation temperatures of the reformer 20 and the fuel cells 100 is, however, preferable to attain the effective temperature equalization in the fuel cells 100.

The temperature control of the reformer 20 varies the oxygen-carbon ratio O/C to adjust the rate of the partial oxidation reaction to the steam reforming reaction proceeding in the reformer 20. In the lower temperature condition of the reformer 20, the supply of oxygen is increased to enhance the ratio O/C and heighten the rate of the partial oxidation reaction. In the higher temperature condition of the reformer 20, on the other hand, the supply of oxygen is decreased to reduce the ratio O/C and lower the rate of the partial oxidation reaction.

One applicable procedure to the temperature control of the fuel cells 100 regulates the rates of the reactions proceeding in the fuel cells 100. The amount of heat produced in the power generation process may be controlled by varying the flow rate of hydrogen supplied to the fuel cells 100. The flow rate of hydrogen is varied, for example, by adjusting a flow rate regulation valve provided between the reformer 20 and the fuel cells 100 or by regulating the supply of the material to the reformer 20. Regulation of at least one of the supplies of oxygen and steam to the reformer 20 changes the rate of the partial oxidation reaction to the steam reforming reaction, so as to control the hydrogen generation efficiency from the material. The production amount of hydrogen may otherwise be controlled by varying the reaction temperature of the reformer 20.

Under the condition of high heat evolution in the power generation process, the reaction for power generation may be suppressed in the fuel cells 100, for example, by spraying a substance for temporarily poisoning the electrodes to interfere with the reaction, for example, a hydrocarbon, onto the anodes 130. Under the condition of low heat evolution in the power generation process, on the other hand, oxygen may directly be supplied to the anodes to burn off hydrogen in the anodes. Alternatively a sufficient amount of the air may be supplied to the cathodes to accelerate the power generation.

Another applicable procedure to the temperature control of the fuel cells 100 regulates the flow of a coolant, that is, the air, supplied to the heat exchanger 150. This temperature control procedure preferably preheats the air supply to decrease the temperature difference between the air temperature and the temperature of the fuel cells 100. The supply of the preheated air to the heat exchanger 150 desirably prevents a local decrease of the temperature in the fuel cells 100.

A7. Effects and Modification

The fuel cell system of the first embodiment makes the reaction for power generation and the methane reforming reaction proceed simultaneously in the fuel cells 100, so as to equalize the temperature in the fuel cells 100 and enhance the operation efficiency. The combination of these parallel reactions effectively prevents an abrupt change of the operation temperature even in a transitional period with a variation in power generation demand to the fuel cells 100 and ensures stable power generation.

The parallel reaction proceeding with the reaction for power generation in the fuel cells 100 is not restricted to the reversible reaction like the methane reforming reaction but may be an irreversible endothermic reaction. The shift reaction of producing hydrogen from carbon monoxide and steam may be initiated in the fuel cells 100. The shift reaction may be caused, in place of or in addition of the methane reforming reaction.

B. Second Embodiment

Figure 6:
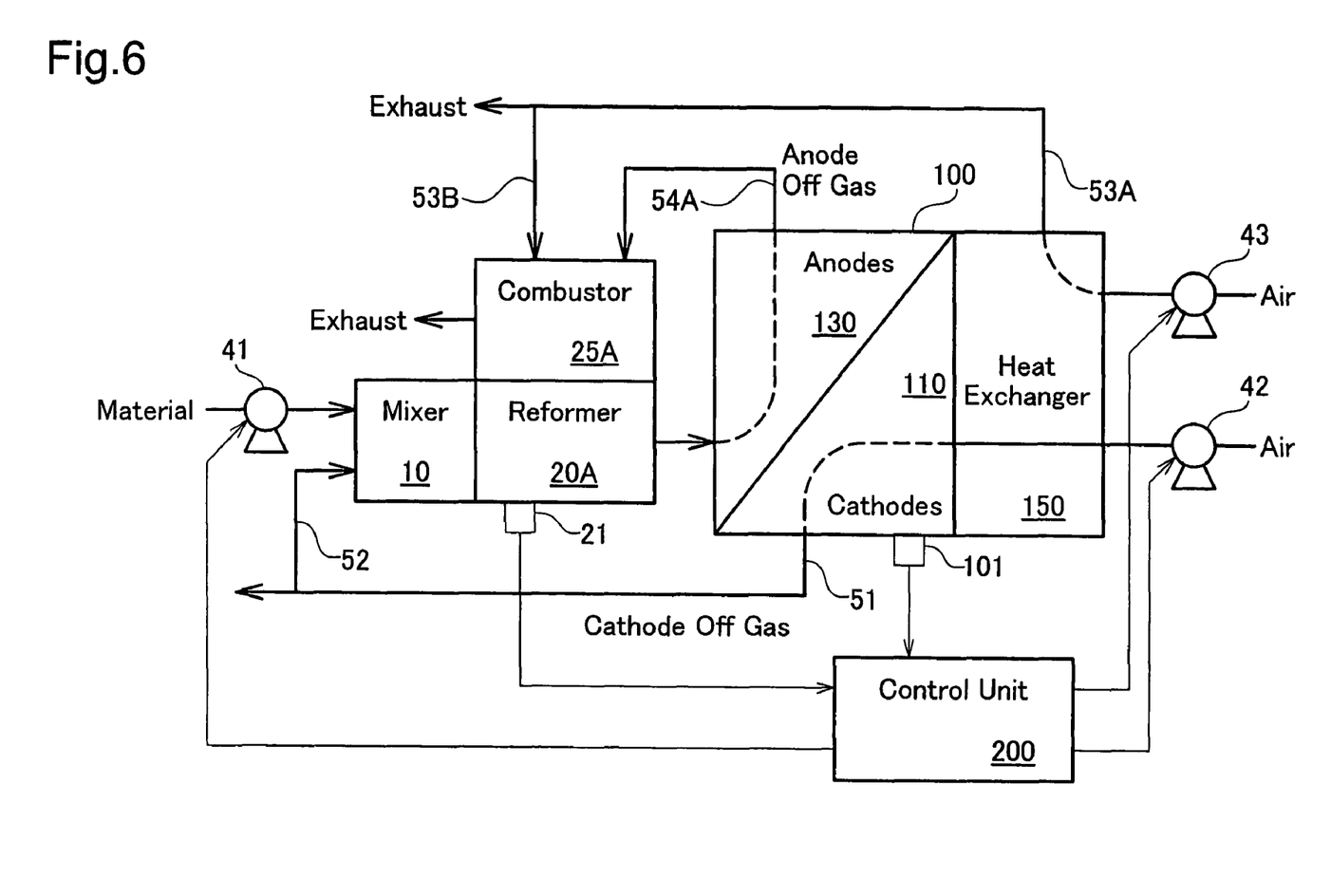
FIG. 6 schematically illustrates the configuration of another fuel cell system in a second embodiment.

FIG. 6 schematically illustrates the configuration of another fuel cell system in a second embodiment. The fuel cell system of the second embodiment has a different structure related to production of the fuel gas, while including the fuel cells 100 of the same unit cell structure as that of the first embodiment.

In the system of the second embodiment, a combustor 25A is arranged besides a reformer 20A and receives a supply of the anode off gas through an exhaust conduit 54A and a supply of the air through air conduits 53A and 53B. The combustor 25A burns off the remaining hydrogen in the anode off gas to heat up the reformer 20A.

Like the first embodiment, the partial oxidation reaction proceeds in parallel with the steam reforming reaction in the reformer 20A. In the structure of the second embodiment, since the combustor 25A supplies some heat, the rate of the steam reforming reaction to the partial oxidation reaction is raised to be endothermic as a total. The rate of the steam reforming reaction to the partial oxidation reaction is raised by, for example, lowering the oxygen-carbon ratio O/C. The oxygen-carbon ratio O/C is determined to balance the amount of heat produced by the combustor 25A with the amount of heat consumed in the reformer 20A.

Like the first embodiment, the methane reforming reaction may be caused in the fuel cells 100 of the second embodiment. In the structure of the second embodiment, heat produced by burning off the remaining hydrogen in the anode off gas is consumed for the reaction in the reformer 20A. This advantageously enhances the total energy efficiency of the whole fuel cell system. The higher proportion of the steam reforming reaction in the reformer 20A desirably increases the hydrogen production efficiency from the material.

The embodiments and their modified examples discussed above are to be considered in all aspects as illustrative and not restrictive. There may be many other modifications, changes, and alterations without departing from the scope or spirit of the main characteristics of the present invention.

INDUSTRIAL APPLICABILITY

The technique of the invention is preferably applicable to the fuel cell systems.

The invention claimed is:
1. A fuel cell system, comprising:
   fuel cell having an anode, a cathode, and an electrolyte membrane as a laminate of an electrolyte layer and a hydrogen permeable metal layer composed of a hydrogen permeable material;
   a fuel gas supply module that supplies a fuel gas containing hydrogen and a hydrocarbon compound to the anode;
   an oxidizing gas supply module that supplies an oxidizing gas to the cathode; and a supply unit that supplies oxygen and steam to a reformer unit, wherein the anode of the fuel cell has a first catalyst supported configured to cause an endothermic reaction of the hydrocarbon compound, a reform control unit configured to control the operation of the reformer unit to cause a partial oxidation reaction of the selected material with the supplied oxygen for production of hydrogen to proceed in parallel with steam reforming reaction of the selected material with the supplied steam for production of hydrogen, the reformer unit configured to support a second catalyst thereon; and the electrolyte membrane comprises:
- a vanadium base layer;
- a proton conductor middle layer on either side of the vanadium base layer; and
- a palladium coat on an opposite side of either proton conductor middle layer from the side of the proton conductor middle layer contacting the vanadium base layer.

2. A fuel cell system in accordance with claim 1, wherein the fuel gas supply module comprises:

the reformer unit configured to generate hydrogen through a reforming reaction of a selected material; and the reform control unit configured to control operation of the reformer unit to generate the hydrocarbon compound with hydrogen.

3. A fuel cell system in accordance with claim 2, wherein the hydrocarbon compound is methane.

4. A fuel cell system in accordance with claim 3, wherein the first catalyst is a methane reforming catalyst including at least one of Ni, Rh, Ru, and their alloys.

5. A fuel cell system in accordance with claim 2, said fuel cell system further comprising:

a temperature control unit configured to control an operation temperature of the fuel cell to a preset target temperature to regulate an amount of heat generated by the reaction in the fuel cell.

6. A fuel cell system in accordance with claim 5, wherein the temperature control unit configured to control an internal temperature of the reformer unit to make a difference between the internal temperature of the reformer unit and the operation temperature of the fuel cell within a preset range.

7. A fuel cell system in accordance with claim 1, wherein the reaction proceeding in the fuel cell is a heat-involved reversible reaction.

8. A fuel cell system in accordance with claim 1, wherein the electrolyte layer is made of an inorganic material, and the hydrogen permeable metal layer forms a base of the electrolyte layer.

9. A fuel cell system in accordance with any claim 1, wherein the electrolyte layer is formed as a water-containing electrolyte layer having a water content, and the hydrogen permeable metal layer is formed on both faces of the water-containing electrolyte layer.

* * * * *